May 28, 1935.  T. NAGEL  2,002,863
METHOD OF PRODUCING FUEL GAS
Filed Jan. 26, 1933
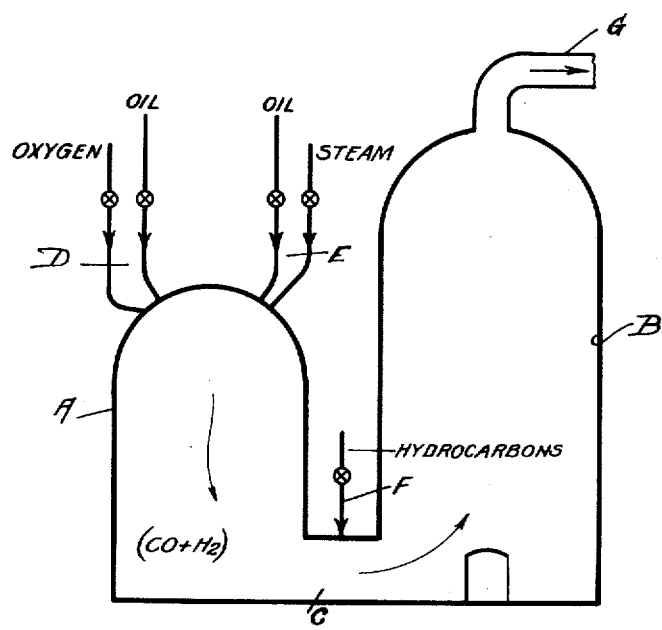
INVENTOR.
Theodore Nagel.
BY
Kiddle, Margesin and Harnidge
ATTORNEYS.

Patented May 28, 1935

2,002,863

UNITED STATES PATENT OFFICE 2,002,863

METHOD OF PRODUCING FUEL GAS

Theodore Nagel, Brooklyn, N. Y., assignor to Carburetted Gas, Inc., a corporation of Delaware Application January 26, 1933, Serial No. 653,619

2 Claims. (Cl. 48—215)

My invention is directed to the provision of a method, intended to be practiced as a continuous flow process, for producing fuel gas from oil.

More specifically my invention provides a continuous flow process for the continuous flow generation of a carbon monoxide, hydrogen gas mixture and/or a carburetted fuel gas, namely: a carbon monoxide, hydrogen, hydrocarbon gas mixture.

Furthermore, my invention not only provides a continuous flow process for generating a carbon monoxide, hydrogen gas mixture and/or a hydrocarbon enriched carbon monoxide, hydrogen gas mixture from oil, but provides a process which is less involved than the intermittent flow gas processes of the prior art; such, for example, as the well known standard intermittent flow water-gas process wherein gas is generated from coke and steam and/or carburetted water-gas generated from coke, steam and oil in the usual generator, carburetter and superheater, requiring cyclic flow alternating operations of "flow" and "make", namely: "heating up" and "gas making".

In the drawing accompanying this application I have illustrated diagrammatically an apparatus suitable for the practice of my invention.

In order that the value of my invention may be clearly appreciated I might mention for example that in the coke, steam intermittent flow water-gas process the heat lost as latent-heat in liberating oxygen from steam (molecular heat of formation of steam=58,060; see Richards Metallurgical Calculations) is twice the amount of heat generated when this oxygen combines with carbon to form carbon monoxide only (molecular heat of formation of carbon monoxide=29,160). This heat shortage necessitates intermittent flow operations for heat storing periods to provide the heat necessary for the water-gas reactions and also provide the heat necessary for carburetting and superheating the gas.

In my continuous flow process the major portion of the necessary oxygen is supplied as free oxygen so as to eliminate the latent-heat loss above referred to, thereby overcoming the necessity for the heat storing periods and the intermittent flow cycles. In addition, in my continuous flow generation of a carbon monoxide and hydrogen gas mixture, the heat generated when the oxygen combines with the carbon to form carbon monoxide is available for converting hydrocarbons into fixed gas for the continuous flow hydrocarbon enrichment of the carbon monoxide and hydrogen gas mixture.

More specifically my invention provides a continuous flow process wherein all the heat necessary for producing a carbon monoxide, hydrogen gas mixture and/or a carbon monoxide, hydrogen, hydrocarbon gas mixture by exothermic reaction of oil and oxygen is generated continuously in the gas itself, instead of the heat being obtained by intermittently preheating coke and intermittently preheating a carburetter and superheater as above described in the intermittent flow generation of carburetted water-gas from coke, steam and oil.

For instance, 100 pounds of oil (in the following examples analyzing 86.4% carbon and 12.24% hydrogen and having a combined heat-of-formation and latent-heat of vaporization of 730 B. t. u. per pound) requires 1290 cubic feet of oxygen for exothermic reaction to partial combustion, converting the carbon of the oil to carbon monoxide only, generating 2580 cubic feet of carbon monoxide and 2190 cubic feet of hydrogen, a total of 4770 cubic feet of gas. When the oxygen is supplied as pure oxygen the gas temperature will then be around 3000° F.

1.3 pounds of steam contains just enough oxygen for the conversion of all the oil carbon of one pound of oil to carbon monoxide only by an endothermic reaction, generating 25.8 cubic feet of carbon monoxide and 47.7 cubic feet of hydrogen, a total of 73.5 cubic feet of gas, and if, for example, the temperature of this gas is to be 2250° F. approximately 7770 heat units are required for this endothermic reaction.

By my invention I am able in a continuous flow process continuously to produce a carbon monoxide, hydrogen gas mixture at any approximately constant temperature desired upward from 1850° F., by continuously controlling the temperature of the carbon monoxide, hydrogen gas mixture produced by the reaction of oil and oxygen to carbon monoxide and hydrogen, by continuously introducing steam and additional oil into the carbon monoxide hydrogen gas mixture.

Let it be assumed for instance that it be desired to produce by a continuous flow process a carbon monoxide, hydrogen gas having an effective heating value of approximately 320 B. t. u. per cubic foot, at an approximately constant temperature of around 2250° F., I may proceed as follows:—

Oil and oxygen in the relative proportions of 100 lbs. of oil to 1290 cu. ft. of pure oxygen are continuously introduced into a hot zone for reaction to carbon monoxide and hydrogen, the proportion of oxygen employed, as above explained, being so limited that substantially all of the carbon of the oil is converted to substantially only carbon monoxide. This reaction generates gas at around 3000° F., instead of at the desired temperature of 2250° F. I accordingly control the temperature of the gas by continuously introducing steam and additional oil into the said carbon monoxide hydrogen gas mixture for endothermic reaction to carbon monoxide and hydrogen in a second zone, the steam and additional oil being supplied in the relative proportions of 1.3 lbs. of water to one pound of oil.

It will be appreciated that the amount of heat liberated in reducing the temperature of the gas from 3000° F. to 2250° F. is utilized in the endothermic reaction of the steam and additional oil, and hence the rate at which the steam and additional oil, in the above mentioned relative proportions, are introduced is determined and controlled by the desired temperature drop and is such that the steam and additional oil are converted by the amount of heat liberated to carbon monoxide and hydrogen only.

The above procedure is based on the assumption that pure oxygen is employed in the exothermic reaction. It will be understood, of course, that when oxygenated air is employed instead of pure oxygen that the volume of oxygenated air required must be sufficient to supply the requisite amount of oxygen above cited. It will be appreciated also that under these last mentioned conditions the nitrogen dilution of the carbon monoxide hydrogen gas reduces its temperature as well as reduces its effective heating value.

The heating value of the carbon monoxide hydrogen gas produced by my continuous flow process may be increased by continuously injecting hydrocarbons into the hot gas for disassociation of the hydrocarbons into fixed hydrocarbon gas enrichment, utilizing the heat permitted to remain for that purpose in the gas to be enriched.

Referring to the drawing which is merely illustrative of an apparatus suitable for the practice of my invention, A designates a gas generator, and B a carburetter, the two being maintained in communication with each other by conduit C.

Oil and oxygen, in properly regulated proportions such as above pointed out, are introduced continuously into the generator A through the valve-controlled pipes D for reaction to carbon monoxide and hydrogen in a hot zone. It will be understood, of course, that initially the generator is brought to operating temperature by any convenient means, as by the combustion of oil therein, thereafter all the heat required being generated continuously in the gas itself.

Temperature control or regulation is effected, as above explained, by the continuous introduction of steam and additional oil in predetermined proportions into the carbon monoxide hydrogen gas mixture for reaction to carbon monoxide and hydrogen in a second zone, this steam and additional oil being supplied through pipes F.

The carbon monoxide hydrogen gas mixture continuously generated flows continuously to the carburetter B, and in its passage through conduit C hydrocarbons enrichment is continuously introduced through pipe F, sufficient heat, as already pointed out, being left in the carbon monoxide, hydrogen gas mixture to supply the heat necessary for disassociating the hydrocarbons enrichment into fixed gas.

The finished gas is discharged continuously from the carburetter B through pipe G.

From all the foregoing, it will be appreciated that I have provided a continuous flow process for the continuous flow production or generation of a carbon monoxide, hydrogen gas mixture in which oil and steam, acting as a temperature control, are continuously reacted endothermally to carbon monoxide and hydrogen by the heat generated in the continuous exothermal reaction of oil and oxygen to carbon monoxide and hydrogen.

It will be appreciated, furthermore, that when it is desired to increase the heating value of the gas thus produced, the temperature of the gas is regulated and controlled so as to be allowed to remain at a sufficiently high temperature for the desired endothermic reaction of disassociating hydrocarbons into fixed gas upon introduction of the hydrocarbons into the carbon monoxide hydrogen gas mixture.

It is to be understood that wherever gas volumes have been stated in the foregoing, these volumes have been reduced to standard temperature pressure conditions.

It is to be understood also that the word "steam" is to be interpreted as covering water as a liquid or as a vapor.

Where the term "oxygen" is employed I intend this term to cover pure oxygen, commercially pure oxygen, oxygen enriched or oxygenated air.

The word "oil" also is to be interpreted as covering petroleum, gas oil, fuel oil, distillates of petroleum, and liquid or vaporized liquid hydrocarbons.

This application is a continuation in part of companion application Serial No. 576,613, filed November 21, 1931.

What I claim is:—

1. The process which comprises continuously introducing oil and oxygen into a hot zone for reaction to carbon monoxide and hydrogen while so limiting the oxygen supplied that substantially all of the carbon of the oil is converted to substantially only carbon monoxide, and continuously controlling the temperature of the carbon monoxide hydrogen gas mixture by continuously introducing steam and additional oil into the said carbon monoxide hydrogen gas mixture for reaction to carbon monoxide and hydrogen in a second zone, while so limiting the amount of steam and hence the oxygen supplied thereby that substantially all of the carbon of the oil introduced therewith is converted to substantially only carbon monoxide, and while so limiting the amount of steam and additional oil that when contacted with the hot carbon monoxide, hydrogen gas mixture produced by the first mentioned oil and oxygen reaction substantially only carbon monoxide and hydrogen are produced.

2. The process which comprises continuously introducing oil and oxygen into a hot zone for reaction to carbon monoxide and hydrogen while so limiting the oxygen supplied that substantially all of the carbon of the oil is converted to substantially only carbon monoxide, continuously controlling the temperature of the carbon monoxide hydrogen gas mixture by continuously introducing steam and additional oil into the said carbon monoxide hydrogen gas mixture for reaction to carbon monoxide and hydrogen in a second zone, while so limiting the amount of steam and hence the oxygen supplied thereby that substantially all of the carbon of the oil introduced therewith is converted to substantially only carbon monoxide, and while so limiting the amount of steam and additional oil that when contacted with the hot carbon monoxide hydrogen gas mixture produced by the first mentioned oil and oxygen reaction substantially only carbon monoxide and hydrogen are produced, and continuously introducing hydrocarbon enrichment material into the gas mixture thus produced while the latter is at a sufficiently high temperature to convert the enrichment material into fixed gases.

THEODORE NAGEL.